US009010800B1

(12) United States Patent  (10) Patent No.: US 9,010,800 B1
Hunter  (45) Date of Patent: Apr. 21, 2015

(54) INTERIOR PANELS HAVING INTEGRATED AIRBAG DOORS FOR MOTOR VEHICLES AND METHODS FOR MAKING THE SAME

(71) Applicant: Faurecia Interior Systems, Inc., Auburn Hills, MI (US)

(72) Inventor: Kenneth William Hunter, Washington, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/289,004

(22) Filed: May 28, 2014

(51) Int. Cl.
*B60R 21/215* (2011.01)
*B60R 21/217* (2011.01)
*B60R 21/2165* (2011.01)
*B32B 37/18* (2006.01)
*B32B 38/00* (2006.01)
*B32B 37/10* (2006.01)
*B60R 21/205* (2011.01)
*B60R 21/16* (2006.01)
*B29C 65/06* (2006.01)
*B29L 31/30* (2006.01)
*B29C 65/00* (2006.01)

(52) U.S. Cl.
CPC .......... *B60R 21/215* (2013.01); *B60R 21/2165* (2013.01); *B32B 37/182* (2013.01); *B32B 38/00* (2013.01); *B32B 37/10* (2013.01); *B60R 2021/161* (2013.01); *B60R 2021/21512* (2013.01); *B32B 2038/0088* (2013.01); *B32B 2398/20* (2013.01); *B32B 2605/003* (2013.01); *B29C 65/069* (2013.01); *B60R 21/217* (2013.01); *B29L 2031/3038* (2013.01); *B29C 66/30223* (2013.01)

(58) Field of Classification Search
CPC  B60R 21/215; B60R 21/217; B60R 13/0256; B29C 66/30223; B29C 66/234; B29C 65/069; B29L 2031/3038
USPC ..................... 280/728.3, 732, 728.2; 403/270
See application file for complete search history.

(56) References Cited

U.S. PATENT DOCUMENTS

| 6,142,520 | A  | 11/2000 | Iino et al. |
| 6,623,029 | B2 | 9/2003  | Sun et al. |
| 7,140,636 | B2 | 11/2006 | DePue et al. |
| 7,234,726 | B2 | 6/2007  | Trevino et al. |
| 7,464,958 | B2 | 12/2008 | Kong |
| 7,484,752 | B2 | 2/2009  | Yasuda et al. |
| 7,556,284 | B2 | 7/2009  | Riha et al. |

(Continued)

FOREIGN PATENT DOCUMENTS

| JP | 2007076393 A | | 3/2007 |
| JP | 2009143510 A | * | 7/2009 |

*Primary Examiner* — Keith Frisby
(74) *Attorney, Agent, or Firm* — Ingrassia Fisher & Lorenz, P.C.

(57) ABSTRACT

Interior panels having integrated airbag doors for motor vehicles and methods for making such interior panels are provided herein. In one example, a method of making an interior panel comprises the steps of welding one or more first weld features of a perimeter flange of an airbag chute-door assembly to a substrate to attach the perimeter flange to the substrate. The one or more first weld features are elongated extending in a first direction. One or more second weld features of a perimeter flange section bracket are welded to the substrate to attach the airbag chute-door assembly to the substrate. The one or more second weld features are elongated extending in a second direction that is generally transverse to the first direction.

12 Claims, 5 Drawing Sheets

(56) References Cited

U.S. PATENT DOCUMENTS

| | | |
|---|---|---|
| 7,806,430 B2 | 10/2010 | Cowelchuk et al. |
| 7,828,323 B1 | 11/2010 | Mazzocchi et al. |
| 8,181,982 B1 | 5/2012 | Ward |
| 8,336,908 B1 | 12/2012 | Kalisz et al. |
| 8,474,861 B1 | 7/2013 | Twork |
| 2005/0127641 A1 | 6/2005 | Cowelchuk et al. |
| 2006/0033313 A1 | 2/2006 | Horiyama |
| 2007/0080521 A1* | 4/2007 | Leserre et al. .............. 280/728.3 |
| 2007/0246918 A1 | 10/2007 | Speelman et al. |
| 2008/0073885 A1 | 3/2008 | Cowelchuk et al. |
| 2010/0207366 A1 | 8/2010 | Evans et al. |
| 2013/0001932 A1 | 1/2013 | Kanno |

* cited by examiner

INTERIOR PANELS HAVING INTEGRATED AIRBAG DOORS FOR MOTOR VEHICLES AND METHODS FOR MAKING THE SAME

TECHNICAL FIELD

The present invention relates generally to interior panels structured for inflatable restraints for motor vehicles, and more particularly to interior panels having integrated airbag doors for motor vehicles and methods for making such interior panels.

BACKGROUND

Motor vehicles often include an inflatable restraint apparatus having a deployable airbag positioned in or behind an interior vehicle panel, such as an instrument panel, door panel, and the like. Many interior panels include an integrated deployment door formed into the interior panel that is designed to break free upon deployment of the airbag. Controlling the opening of the deployment door is desirable for providing a clean deployment, e.g., minimal or no fragmentation, of the airbag through the interior panel. Often an area of the interior panel surrounding the deployment door is scored or pre-weakened, e.g., via laser scoring, mechanical scoring, or the like, to form a seam that facilitates a clean airbag deployment. Additionally, supporting structures behind the interior panel can be attached to the deployment door to further control the opening of the deployment door.

In one example disclosed in U.S. Pat. No. 7,484,752, issued to Yasuda et al., a fragile splitting contour is formed into a rectangular shape along the backside of an instrument panel to define a door section that opens during airbag deployment. An airbag apparatus containing an airbag is mounted to reinforcing members and an airbag supporting frame. The reinforcing members and the airbag supporting frame are welded to the backside of the instrument panel along and around the door section. During welding, the reinforcing members and the airbag supporting frame are vibrated back and forth along an axis to attach the reinforcing members and the airbag supporting frame to the substrate. Unfortunately, some instrument panel designs have relatively highly contoured surfaces around or near the door section that can limit space needed for vibrating the airbag apparatus supporting structure back and forth along an axis to attach the airbag apparatus to the instrument panel.

Accordingly, it is desirable to provide interior panels having integrated airbag doors for motor vehicles and methods for making such interior panels that allow for welding an airbag apparatus supporting structure to a substrate within a limited space and/or along highly contoured substrate surfaces. Furthermore, other desirable features and characteristics of the present invention will become apparent from the subsequent detailed description and the appended claims, taken in conjunction with the accompanying drawings and this background.

BRIEF SUMMARY

Interior panels having integrated airbag doors for motor vehicles and methods for making such interior panels are provided herein. In accordance with an exemplary embodiment, an interior panel having an integrated airbag door for a motor vehicle comprises a substrate having an opening extending therethrough. An airbag chute-door assembly that comprises a chute wall at least partially surrounding an interior space. The chute wall is configured to direct passage of an airbag through the interior space towards the opening during deployment. A door flap portion is pivotally connected to the chute wall and at least partially covers the opening. A perimeter flange extends from the chute wall away from the interior space. The perimeter flange comprises one or more first weld features that attach the perimeter flange to the substrate. The one or more first weld features are elongated extending in a first direction. A perimeter flange section bracket is disposed adjacent to a first side of the chute wall opposite the interior space. The perimeter flange section bracket comprises one or more second weld features that attach the airbag chute-door assembly to the substrate. The one or more second weld features are elongated extending in a second direction that is generally transverse to the first direction.

In accordance with another exemplary embodiment, a method of making an interior panel having an integrated airbag door for a motor vehicle is provided. The method comprises the steps of welding one or more first weld features of a perimeter flange of an airbag chute-door assembly to a substrate to attach the perimeter flange to the substrate. The one or more first weld features are elongated extending in a first direction. One or more second weld features of a perimeter flange section bracket are welded to the substrate to attach the airbag chute-door assembly to the substrate. The one or more second weld features are elongated extending in a second direction that is generally transverse to the first direction.

BRIEF DESCRIPTION OF THE DRAWINGS

The present invention will hereinafter be described in conjunction with the following drawing figures, wherein like numerals denote like elements, and wherein.

DETAILED DESCRIPTION

The following Detailed Description is merely exemplary in nature and is not intended to limit the invention or the application and uses of the invention. Furthermore, there is no intention to be bound by any theory presented in the preceding background or the following detailed description.

Various embodiments contemplated herein relate to interior panels having integrated airbag doors for motor vehicles and methods for making such interior panels. The exemplary embodiments taught herein provide an interior panel that comprises a substrate having an opening extending therethrough. An airbag chute-door assembly comprises a chute wall surrounding an interior space. The chute wall is configured to direct passage of an airbag through the interior space towards the opening during deployment. A door flap portion is pivotally connected to the chute wall for at least partially covering the opening. A perimeter flange extends from the chute wall away from the interior space. The perimeter flange comprises one or more first weld features for attaching the perimeter flange to the substrate. In an exemplary embodiment, the one or more first weld features are elongated extending in a first direction so that the perimeter flange can be vibrated back and forth along the first direction during a first welding operation to attach the perimeter flange to the substrate.

A perimeter flange section bracket is positioned adjacent to a side of the chute wall opposite the interior space. The perimeter flange section bracket comprises one or more second weld features for attaching the airbag chute-door assembly to the substrate. In an exemplary embodiment, the one or more second weld features are elongated extending in a second direction that is generally transverse to the first direction so that the perimeter flange section bracket can be vibrated back and forth along the second direction during a second welding operation to attach the airbag chute-door assembly to the substrate. It has been advantageously found that by attaching the airbag chute-door assembly to the substrate using multiple welding operations each having a different direction for vibrating the corresponding welding features back and forth permits the airbag chute-door assembly to be attached to the substrate within a relatively limited space and/or along relatively highly contoured substrate surfaces.

Figure 1:
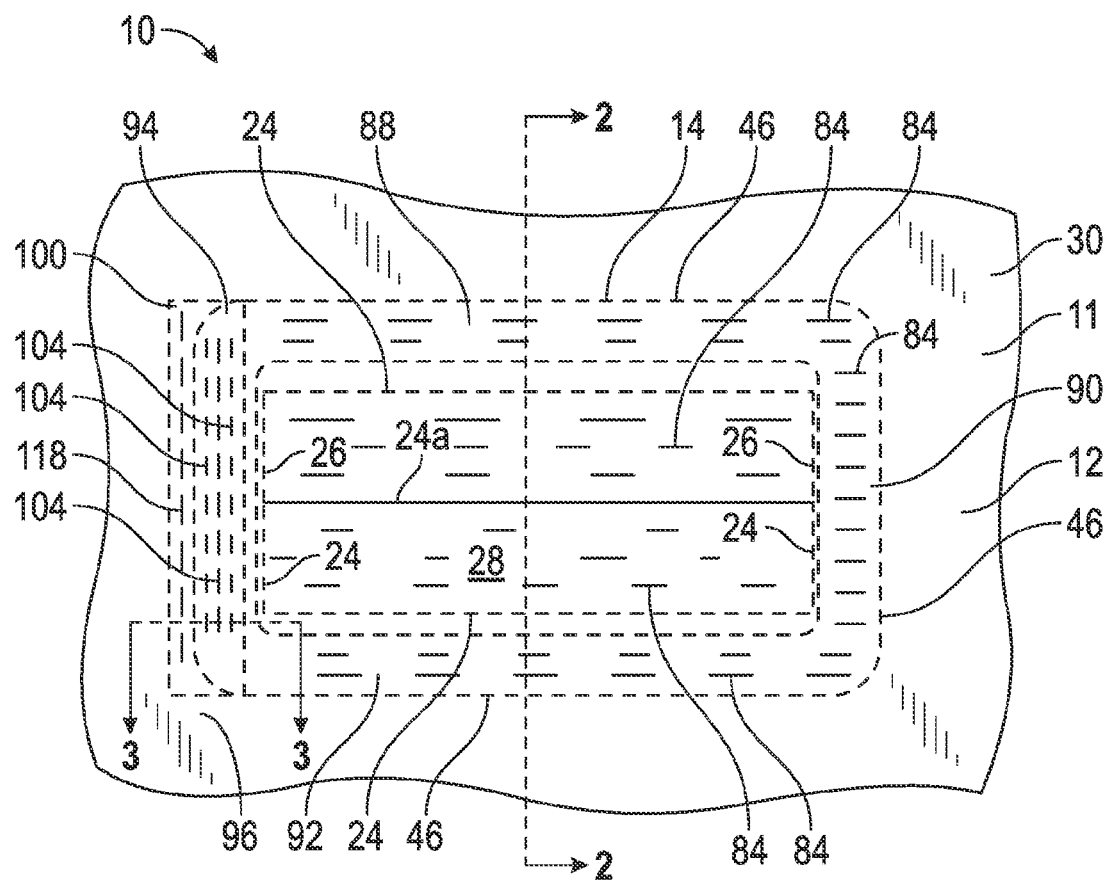
FIG. 1 is a plan view of a portion of an interior panel including an integrated airbag door for a motor vehicle in accordance with an exemplary embodiment.
Figure 2:
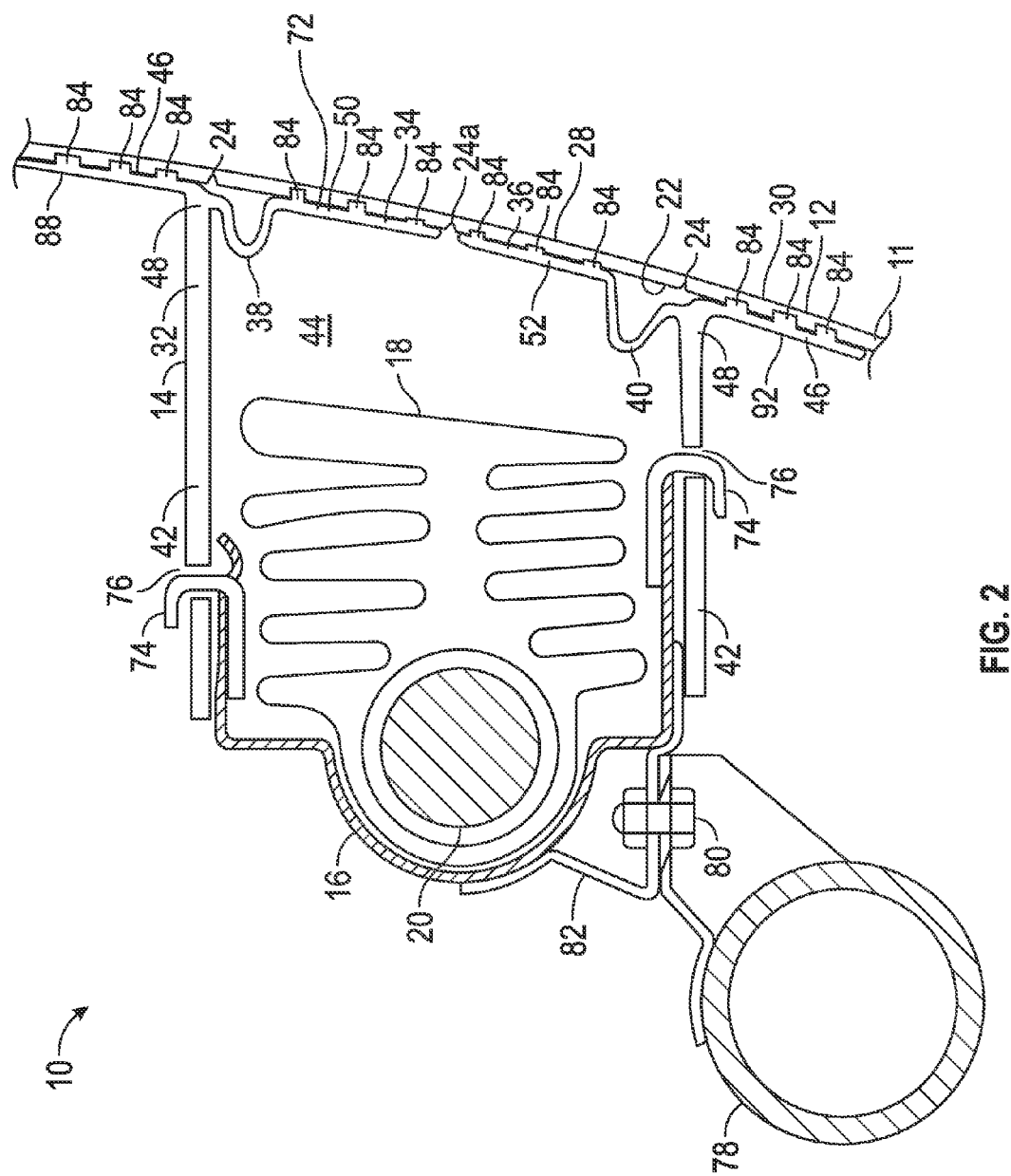
FIG. 2 is a vertical sectional view of the interior panel depicted in FIG. 1 along line 2-2.

FIG. 1 is a plan view of a portion of an interior panel 10 in accordance with an exemplary embodiment. FIG. 2 is a vertical sectional view of the interior panel 10 depicted in FIG. 1 along line 2-2. In an exemplary embodiment, the interior panel 10 is an instrument panel that can be positioned forward of a driver seat and a front passenger seat of a motor vehicle. As such, FIGS. 1 and 2 depict views of the interior panel 10 forward of the front passenger seat. Alternatively, the interior panel 10 can be a door panel or other interior vehicle trim panel. As illustrated, the interior panel 10 comprises a substrate 11, an airbag chute-door assembly 14, and an airbag module 16 that contains a deployable airbag 18 and an inflator 20.

In an exemplary embodiment, the substrate 11 is formed of a PP/TPO material 30. As used herein, the term "PP/TPO material" refers to a material that contains polypropylene (PP) and/or thermoplastic olefin (TPO). In an exemplary embodiment, the PP/TPO material 30 is a material that comprises PP and/or TPO as the primary component(s). In addition to PP and/or TPO, the PP/TPO material 30 may also comprise one or more other ingredients, such as rubber, fillers such as talc and the like, impact modifiers, stabilizers, processing additives and/or mold release agents, reinforcing fibers such as glass fibers, natural fibers, and the like, anti-scratch additives, pigments and/or molded-in-color additives, adhesion promoters, recycled product(s), and the like. Other ingredients known to those skilled in the art may also be included in the PP/TPO material 30. In an exemplary embodiment, the PP/TPO material 30 is a grade of PP/TPO material that has relatively high mechanical properties including a flexural modulus at 23° C. of at least about 1500 MPa, such as from about 1500 to about 3000 MPa, for example from about 1600 to about 2600 MPa, and is suitable for forming instrument panel substrates. Non-limiting examples of instrument panel substrate grade PP/TPO materials are ATX832™, ATX880™, and ATX639™ manufactured by Advanced Composites, Inc., located in Sydney, Ohio. Many other suitable grades of PP/TPO materials are also commercially available from various other suppliers.

The outer surface 12 of the substrate 11 can be a hard decorative surface, such as a mold-in-color surface, a painted surface, or the like. Alternatively, the outer surface 12 can be covered by foam and skin, such as in well known foam-in-place or tri-laminate constructions, to provide a "soft instrument panel."

The back surface 22 of the substrate 11 is scored or pre-weakened to define a seam 24 that forms a rectangular shape that is long in the horizontal direction. A center seam 24a extends between lateral sides 26 to divide the rectangular shape, forming an "H-pattern." The seams 24 and 24a define an integrated airbag door 28 that separates from the substrate 11 along the seams 24 and 24a and that opens in a bi-parting manner to permit the airbag 18 to unfold and inflate outside of the interior panel 10 to facilitate a clean airbag deployment. Alternatively, the back surface 22 of the substrate 11 may be scored or pre-weakened to define the seam 24 without the center seam 24a to form a "U-pattern." Other patterns and seam configurations for pre-weakening the substrate 11 to form an integrated airbag door known to those skilled in the art may be used.

In an exemplary embodiment, the seams 24 and 24a are formed using a laser scoring process. In one example, the seams 24 and 24a are formed by radiating a laser beam having a beam diameter of from about 0.1 to about 0.5 mm and a wavelength of about 10.6 μm onto the back surface 22 of the substrate 11 to create dot-like slit pores having a depth that partially penetrates the substrate 11. Alternatively, the seams 24 and 24a may be formed using mechanical scoring or any other substrate pre-weakening process known to those skilled in the art.

Attached to the back surface 22 of the substrate 11 is the airbag chute-door assembly 14. The airbag chute-door assembly 14 comprises a chute portion 32, door flap portions 34 and 36, and hinges 38 and 40 that pivotally connect the door flap portions 34 and 36, respectively, to the chute portion 32. In an exemplary embodiment, the door flap portions 34 and 36 are configured as a "H-pattern" door arrangement that helps the integrated airbag door 28 to open in a bi-parting manner to facilitate a clean airbag deployment. The chute portion 32 has a chute wall 42 that at least partially surrounds an interior space 44. The interior space 44 is sized to permit passage of the airbag 18 towards the door flap portions 34 and 36 and the integrated airbag door 28 during airbag deployment. Attached to the chute wall 42 is the airbag module 16 that accommodates the airbag 18 in a folded state. As shown, the airbag module 16 has a plurality of hooks 74 that project outwardly through chute wall openings 76 to engage the chute wall 42. The airbag module 16 is attached to a cross member 78 by a bolt and nut 80 via a supporting member 82.

The door flap portions 34 and 36 comprise door flap sections 50 and 52. In an exemplary embodiment, the hinges 38 and 40 are integrally connected to the door flap sections 50 and 52, respectively, and the chute wall 42 to define "living hinges." The chute portion 32 comprises the chute wall 42 and a perimeter flange 46 that extends from an end portion 48 of the chute wall 42 away from the interior space 44.

In an exemplary embodiment and as illustrated, the door flap sections 50 and 52, the hinges 38 and 40, the chute wall 42, and the perimeter flange 46 are formed as an injection molded monolithic structure of a TPE material 72 that has a different composition than the PP/TPO material 30. The TPE material 72 is elastomeric and relatively compliant, and has a relatively high elongation over a wide range of temperatures (e.g., from about −30° C. to about 115° C.) and ductility at cold temperatures (e.g., about −30° C.). The TPE material 72 can be a thermoplastic material that comprises a styrenic component, an olefinic component, a urethane component, a copolyester component, or combinations thereof. Alternatively, the TPE material 72 can be a thermoplastic vulcanizate (TPV). In an exemplary embodiment, the TPE material 72 has a relatively high elongation at 23° C. of about 25% or greater, such as from about 25% to about 500%, for example from about 50% to about 300%. In an exemplary embodiment, the TPE material 72 has a relatively low flexural modulus at 23° C. of about 1,000 MPa or less, such as about 500 MPa or less, for example from about 1 MPa to about 100 MPa. The TPE material 72 helps the door flap sections 50 and 52, the hinges 38 and 40, the chute wall 42, and the perimeter flange 46 to absorb energy and control movement of the integrated airbag door 28 and the airbag module 16 during airbag deployment. Non-limiting examples of suitable TPE materials include various grades of HIPEX® and Thermolast® TPEs manufactured by Kraiburg TPE Corporation, located in Duluth, Ga. Many other suitable TPE materials are also commercially available from other suppliers.

In an exemplary embodiment, the perimeter flange 46 and the door flap sections 50 and 52 each have a plurality of weld features 84 (e.g., positive features or ribs) for attaching the perimeter flange 46 and the door flap sections 50 and 52, respectively, to the substrate 11. In particular and also with reference to FIG. 3, the weld features 84 are elongated and extend in a direction (indicated by double headed arrow 86) so that the weld features 84 can be welded to the backside 22 of the substrate 11 via vibrating the weld features 84 along the direction 86 to attach the airbag chute-door assembly 14 to the substrate 11. As illustrated, in an exemplary embodiment, the perimeter flange 46 comprises the weld features 84 extending along perimeter flange sections 88, 90, and 92 in the direction 86 while another perimeter flange section 94 does not include any of the weld features 84 that extend in the direction 86. As such, the perimeter flange sections 88, 90, and 92 are directly welded to the substrate 11 via the welding features 84 while the perimeter flange section 94 is not directly welded to the substrate 11.

Figure 3:
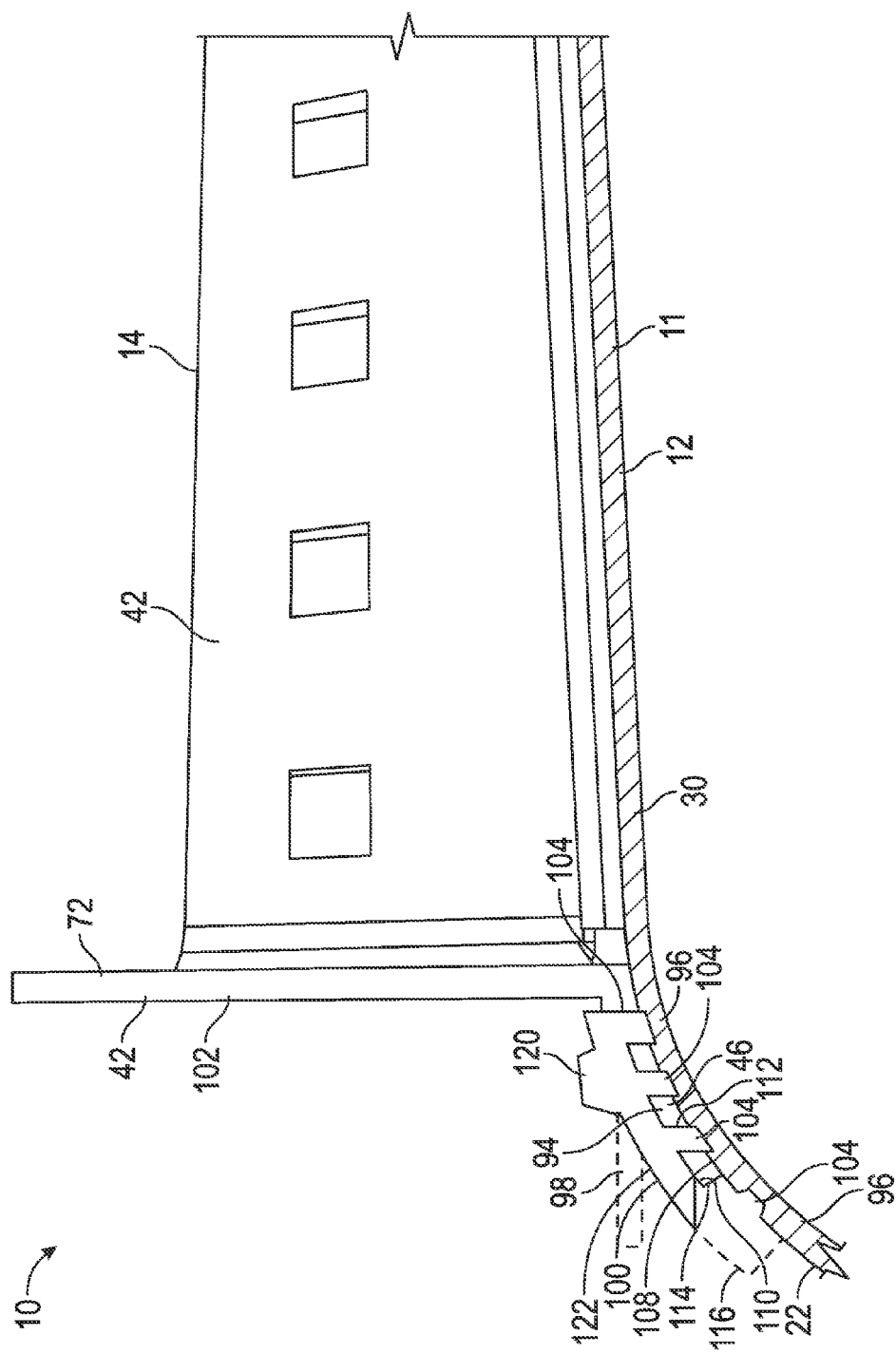
FIG. 3 is a horizontal sectional view of the interior panel depicted in FIG. 1 along line 3-3.
Figure 4:
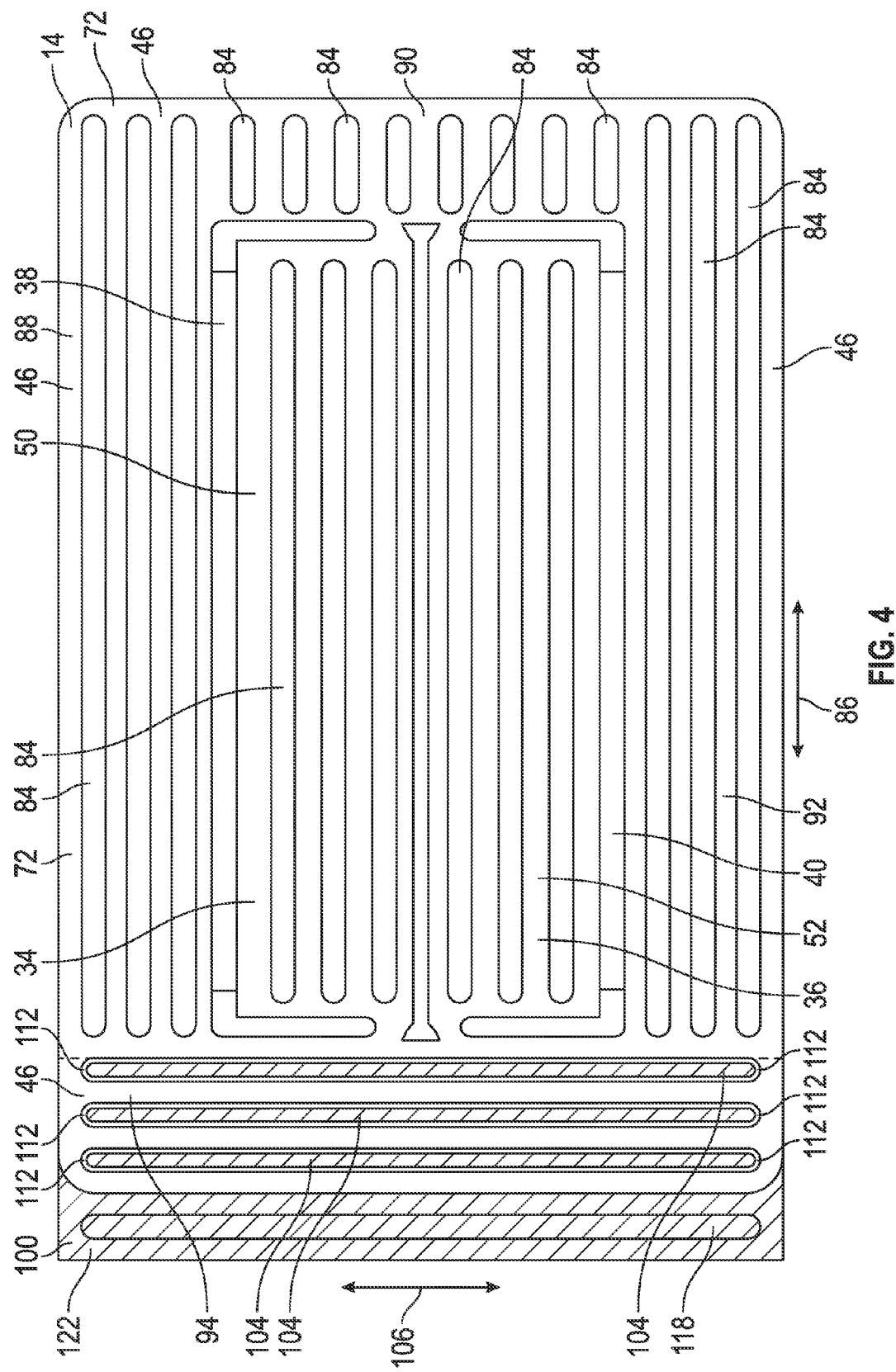
FIG. 4 is a plan view of an airbag chute-door assembly and a perimeter flange section bracket in accordance with an exemplary embodiment.

Referring to FIGS. 1 and 3-4, as illustrated, the perimeter flange section 94 is disposed adjacent to a contoured surface section 96 (e.g., curved surface) of the substrate 11. In an exemplary embodiment, to advantageously simplify a molding process, the perimeter flange section 94 is molded having a relatively "as molded" flat condition 98 (indicated by dashed lines) and is forced against the contoured surface section 96 via a perimeter flange section bracket 100. In an exemplary embodiment, the perimeter flange section bracket 100 is positioned adjacent to a side 100 to of the chute wall 42 and has a plurality of weld features 104 that are elongated extending in a direction (indicated by double headed arrow 106) that is generally transverse to the direction 86. In an exemplary embodiment, depending upon the contour of the substrate 11, the direction 106 forms an angle of from about 45 to about 135°, such as from about 60 to about 120°, such as from about 75 to about 105°, for example about 90° to the direction 86.

In an exemplary embodiment, the perimeter flange section 94 has a substrate facing surface 108, a back surface 110 that faces opposite the substrate facing surface 108, and openings 112 formed through the perimeter flange section 94. As illustrated, the perimeter flange section bracket 100 is disposed along the back surface 110 and the weld features 104 extend through the openings 112 such that the weld features 104 are proud and can be attached (e.g., welded) directly to the back surface 22 of the substrate 11 adjacent to the substrate facing surface 108. In an exemplary embodiment, the openings 112 are configured as juxtaposed slots and the weld features 104 are configured as ribs that correspondingly extend through the juxtaposed slots. Advantageously, this configuration facilitates vibration welding of the weld features 104 through the openings 112 to the back surface 22 of the substrate 11.

In an exemplary embodiment, depending upon the shape of the substrate 11, the perimeter flange section bracket 100 may terminate proximate an outermost edge 114 of the perimeter flange section 94, or alternatively, may extend past the outermost edge 114 to define an overhang portion 116 (indicated by dashed lines) of the perimeter flange section bracket 100. As illustrated, the overhang portion 116 comprises an additional weld feature(s) 118 that is elongated extending in the direction 106 and that is attached to the substrate 11 adjacent to the outermost edge 114 of the perimeter flange section 94. Advantageously, this configuration enhances coupling between the airbag chute-door assembly 14 and the substrate 11 to help focus deployment energy towards advancing the airbag 18 through the integrated airbag door 28.

In an exemplary embodiment, the perimeter flange section bracket 100 further comprises a locator lug feature 120 that is disposed on a surface opposite the surface that defines the weld features 104. Advantageously, the locator lug feature 120 helps locate the perimeter flange section bracket 100 in a vibration welding fixture for vibration welding the perimeter flange section bracket 100 to the substrate 11 to facilitate manufacturability.

In an exemplary embodiment, the perimeter flange section bracket 100 is formed a PP/TPO material 122 that has a different composition than the TPE material 72. In an exemplary embodiment, the PP/TPO materials 30 and 122 have the same or essentially equivalent compositions. As used herein, the term "the same or essentially equivalent composition" means that the composition of the two materials is the same, or the two materials are the same grade or equivalent grades of PP/TPO material that differ in composition within typical compounding/manufacturing tolerances, or the two materials are similar grades of PP/TPO material that differ in composition within typical compounding/manufacturing tolerances and/or by minor ingredients that add up to about 5 weight percent (wt. %) or less of the total composition. As such, the PP/TPO materials 30 and 122 have similar physical properties including melting point, mechanical properties including flexural modulus, and processing properties including melt flow and welding properties. It has been found that welding of the perimeter flange section bracket 100 to the various areas of the substrate 11 where the weld features 104 (and optionally 118) and the substrate 11 are formed from similar PP/TPO materials results in a robust welding process that produces weld joints between the perimeter flange section bracket 100 and the substrate 11 with relatively high weld strength.

Figure 5:
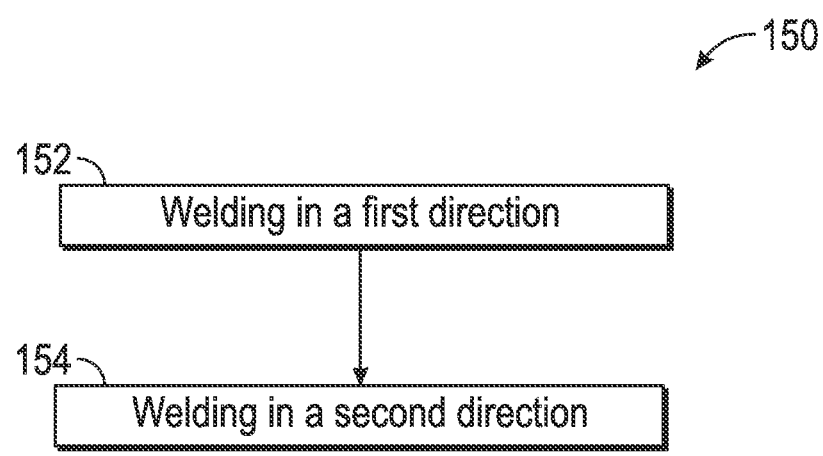
FIG. 5 is a flowchart of a method of making an interior panel having an integrated airbag deployment door for a motor vehicle in accordance with an exemplary embodiment.

Referring to FIG. 5, a flowchart of a method 150 of making an interior panel having an integrated airbag door for a motor vehicle in accordance with an exemplary embodiment is provided. The method 150 comprises welding one or more first weld features of a perimeter flange of an airbag chute-door assembly to a substrate (step 152) to attach the perimeter flange to the substrate. The one or more first weld features are elongated extending in a first direction. One or more second weld features of a perimeter flange section bracket are welded to the substrate (step 154) to attach the airbag chute-door assembly to the substrate. The one or more second weld features are elongated extending in a second direction that is generally transverse to the first direction.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An interior panel having an integrated airbag door for a motor vehicle, the interior panel comprising:
   a substrate having an opening extending therethrough;
   an airbag chute-door assembly comprising:
      a chute wall at least partially surrounding an interior space and configured to direct passage of an airbag through the interior space towards the opening during deployment;
      a door flap portion pivotally connected to the chute wall and at least partially covering the opening;
      a perimeter flange extending from the chute wall away from the interior space, the perimeter flange comprising one or more first weld features that attach the perimeter flange to the substrate, wherein the one or more first weld features are elongated extending in a first direction; and
   a perimeter flange section bracket disposed adjacent to a first side of the chute wall opposite the interior space, the perimeter flange section bracket comprising one or more second weld features that attach the airbag chute-door assembly to the substrate, wherein the one or more second weld features are elongated extending in a second direction that is generally transverse to the first direction.

2. The interior panel of claim 1, wherein the perimeter flange has a first flange section that extends from the first side of the chute wall away from the interior space and a second flange section that extends from a second side of the chute wall away from the interior space, wherein the second flange section comprises the one or more first weld features and the first flange section is securely positioned between the substrate and the perimeter flange section bracket.

3. The interior panel of claim 2, wherein the first flange section has a substrate facing surface, a back surface that faces opposite the substrate facing surface, and one or more openings formed therethrough extending from the substrate facing surface to the back surface, and wherein the perimeter flange section bracket is disposed along at least a portion of the back surface and extends through the one or more openings to position the one or more second weld features adjacent to the substrate facing surface.

4. The interior panel of claim 3, wherein the one or more second weld features comprise a plurality of second weld features and the one or more openings comprise a plurality of juxtaposed slots, and wherein the second weld features are correspondingly disposed through the juxtaposed slots and are attached to the substrate.

5. The interior panel of claim 4, wherein the juxtaposed slots extend in the second direction generally transverse to the first direction.

6. The interior panel of claim 3, wherein the perimeter flange section bracket extends past an outermost edge of the first flange section to define an overhang portion of the perimeter flange section bracket, and wherein the overhang portion comprises an additional second weld feature that is elongated extending in the second direction and that is attached to the substrate adjacent to the outermost edge of the first flange section.

7. The interior panel of claim 1, wherein the perimeter flange section bracket has a front surface and a back surface that faces opposite the front surface, wherein the one or more second weld features are disposed along the front surface, and wherein the perimeter flange section bracket further comprises a locator lug feature that is disposed along the back surface.

8. The interior panel of claim 1, wherein the substrate comprises a first PP/TPO material and the perimeter flange section bracket comprises a second PP/TPO material, and wherein the first and second PP/TPO materials have the same or essentially equivalent compositions.

9. The interior panel of claim 8, wherein the airbag chute-door assembly comprises a TPE material that has a different composition than the first and second PP/TPO materials.

10. The interior panel of claim 1, wherein the chute wall has a plurality of openings formed therethrough for attaching an airbag module to the chute wall.

11. The interior panel of claim 1, wherein the substrate is scored adjacent to the airbag chute-door assembly forming a seam that defines the integrated airbag door.

12. The interior panel of claim 1, further comprising:
   an airbag module operatively attached to the chute wall to direct the airbag through the interior space towards the substrate during deployment.

\* \* \* \* \*